United States Patent [19]

Morgan et al.

[11] 4,276,636
[45] Jun. 30, 1981

[54] CUSHION DISC FOR PHONOGRAPH RECORDS

[76] Inventors: Stanley A. Morgan; Edgar A. Dixon, both of 104 Montford Ave., Mill Valley, Calif. 94941

[21] Appl. No.: 833,888

[22] Filed: Sep. 16, 1977

[51] Int. Cl.³ .............................................. G11B 3/00
[52] U.S. Cl. .................................................. 369/291
[58] Field of Search ............................ 274/1 R, 42 R

[56] References Cited

U.S. PATENT DOCUMENTS

| | | | |
|---|---|---|---|
| 2,906,536 | 9/1959 | Mauerhoff | 274/42 R |
| 3,051,496 | 8/1962 | Borgia | 274/42 R |
| 3,169,023 | 2/1965 | Rvas | 274/42 R |
| 3,360,271 | 12/1967 | George | 274/42 R |
| 3,540,736 | 11/1970 | Palle | 274/42 R |
| 3,854,729 | 12/1974 | Downs | 274/42 R |
| 4,013,296 | 3/1977 | Keeney | 274/42 R |
| 4,061,341 | 12/1977 | Kaplan | 274/1 R |

*Primary Examiner*—Steven L. Stephan
*Attorney, Agent, or Firm*—Ernest M. Anderson

[57] ABSTRACT

A protective device for phonograph records comprising a cushion platter including a circular hoop, a circular inner ring and a plurality of spoke-like attachments supporting said inner circular ring from and within said hoop, and having a soft cover that envelops the hoop and spoke-like attachments; and means for disconnectably attaching the cushion platter to the center ungrooved portion of a phonograph record, said means comprising a pair of ring attachments, each having pressure-sensitive adhesive applied to one side, said ring attachments being affixed to opposite sides of a phonograph record; whereby the protective disc may be selectively connected and disconnected to either of said circular ring attachments.

2 Claims, 3 Drawing Figures

U.S. Patent    Jun. 30, 1981    4,276,636
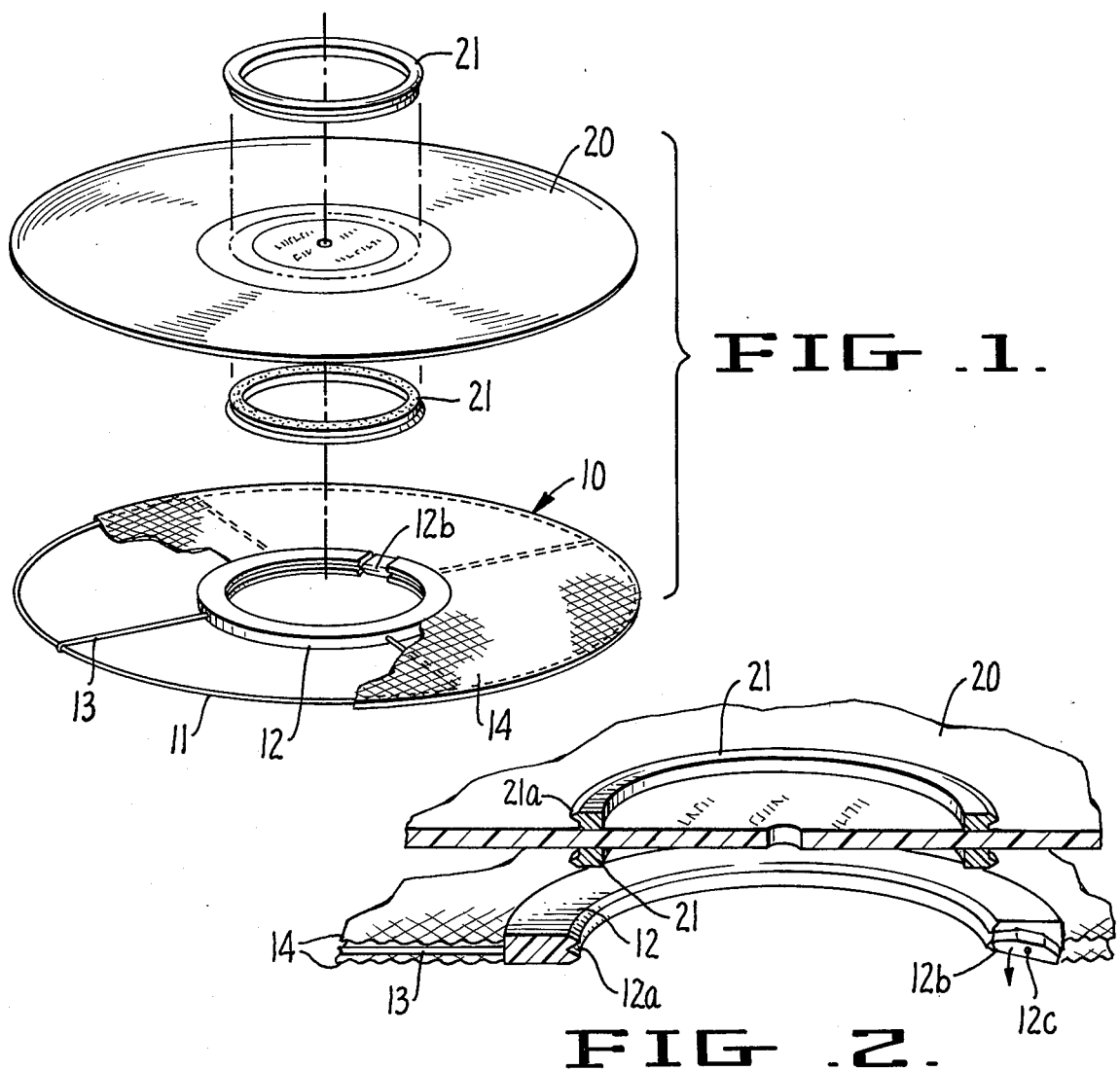
FIG. 1.
FIG. 2.
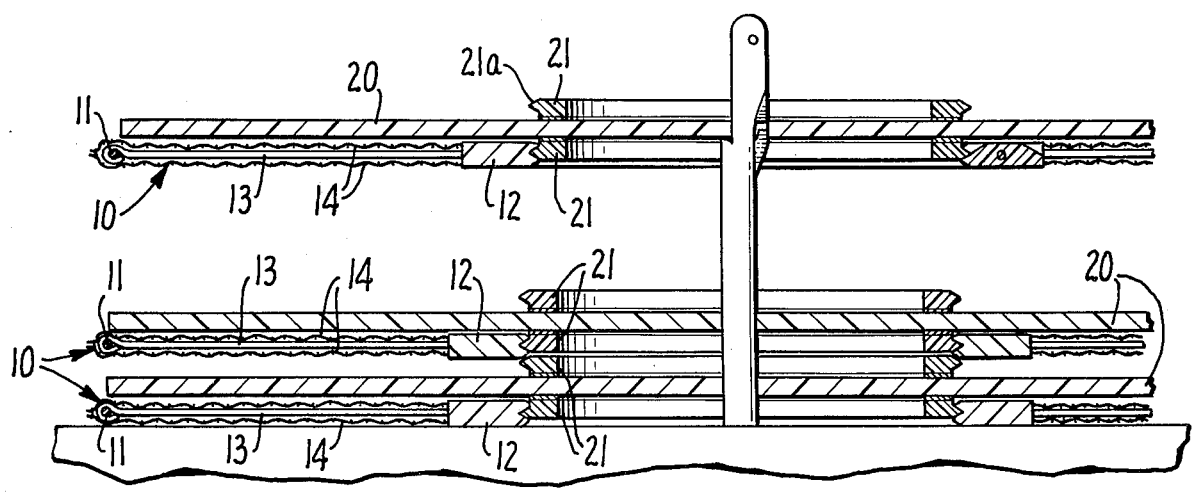
FIG. 3.

CUSHION DISC FOR PHONOGRAPH RECORDS

PRIOR ART STATEMENT

The following prior art references were obtained as a result of a novelty search directed to this invention:

U.S. Pat. No. 2,906,536
U.S. Pat. No. 3,051,496
U.S. Pat. No. 3,169,023
U.S. Pat. No. 3,360,271
U.S. Pat. No. 3,540,736
U.S. Pat. No. 3,854,729

Each of the foregoing patents is directed to a means for protecting a stack of phonograph records as utilized by a multiple disc record changer.

SUMMARY OF THE INVENTION

The main object of the present invention is to provide a safety or protective disc for phonograph records as they are being fed or played upon the spindle of a record changer-player. The novelty of the invention resides in the construction of the disc and the means which enable them to be repeatedly connected and disconnected to either side of a phonograph record. The invention carries with it the attributes of other protective devices in that it separates and protects each of the records in a stack of records while they are being played, thereby eliminating the possibility of abrasive contacts which might result in scratching or otherwise damage the records.

DESCRIPTION OF THE DRAWINGS

In the drawings, forming a part of this application, and in which like parts are identified by like reference numerals, FIG. 1 is a perspective view of a preferred embodiment of the invention in a protective disc and mounting, parts thereof being shown in exploded relationship to a phonograph record to which applied;

FIG. 2 is an enlarge detailed and perspective view illustrating details of construction, all parts being shown in cross section;

FIG. 3 is a vertical section taken through a stack of records supported on a table and a spindle of an automatic record changer-player, a preferred embodiment of the invention being connected to the underside of each phonograph record.

Referring to FIG. 1 in particular, a preferred embodiment of the invention comprises a protective disc 10 comprised of a resilient circular hoop 11 and an inner circular ring 12 supported from and within said hoop by means of a plurality of spoke-like attachments 13. In a preferred form of the invention, the hoop, ring and attachments may be integrally formed of plastic material. A soft cover 14 envelops hoop 11 and spoke-like attachments 13. The overall size of protective disc 10, it will be understood, should complement and be substantially the same size as the record which it is to protect.

Protective disc 10 is secured to either side of a record 20 by means of a pair of circular attachment rings 21. For this purpose, pressure-sensitive adhesive is applied to one side of each ring 21 and the rings are affixed by said adhesive to the ungrooved portion of a phonograph record. The opening within each ring 21 permits visual observation of the information normally shown on the records, such as titles and performing artists' names.

Means is further provided for selectively attaching protective disc 10 to either side of record 20. This is accomplished with a snap interlocking connection between circular ring 12 and attachment rings 21, and is attained by forming a peripheral groove 12a on the inner edge of ring 12 and a complementary outer lip 21a on the outer peripheral edge of rings 21. A close tolerance manufacture of rings 12 and 21 and a selection of suitably resilient material, such as a plastic having a resilient memory, provides the desired snap connection.

Referring to FIG. 2, a preferred construction of ring 12 provides a pivoted lever 12b in one section of the ring to enhance a disconnection from rings 21. Lever 12b and its pivotal supports 12c may be formed integrally with ring 12 itself, although various other means may be utilized to facilitate disconnections.

Referring to FIG. 3, the inner edge of lever 12b is engageable with the underside of lip 21a of rings 21. It will also be evident that a slight pivotal actuation of lever 12b upon pivot 12c produces a wedging action and separates ring 12 from attachment ring 21.

Although a preferred embodiment of the invention has been illustrated and described, various modifications and changes may be resorted to without departing from the spirit of the invention or the scope of the appended claims, and each of such modifications and changes is contemplated. For example, it is contemplated that the function of attachment rings 21 may be supplied by forming phonograph records with an integral center portion having a peripheral lip.

What is claimed is:

1. A protective disc for phonograph records and attachment means for disconnectably attaching said protective disc to phonograph records having approximately the same size and shape as the phonograph record with which it is to be used; said protective disc comprising:

a circular hoop, an inner circular ring, a plurality of spoke-like attachments supporting said inner circular ring from and within said hoop;

said attachment means comprising a second circular ring having a pressure sensitive adhesive applied to one side for affixation to the center ungrooved portion of a phonograph record, a groove formed on the peripheral edge of one of said rings and a snap engageable lip formed on the peripheral edge of the outer ring, said inner circular ring being formed with a pivoted lever having an edge portion engageable with the second circular ring, pivotal actuation of said lever causing a disengagement of said rings.

2. Protective devices for phonograph records and the like comprising:

a protective disc having an inner ring and opening;

a pair of circular attachment rings, each ring having an external circumference complementary to but slightly larger than the opening of said protective disc, and pressure sensitive adhesive applied to one side, said rings being adapted for attachment to the center ungrooved portions on opposite sides, respectively, of a phonograph record;

and means for selectively connecting the inner circular ring of said protective disc to one or the other said attachment rings, said inner circular ring and opening of said protective disc being formed with an inner circular groove, each of said circular ring attachments being formed with an outer peripheral lip engageable with said groove by snap attachment, said inner circular ring of said protective disc being formed with a pivoted lever having an edge portion engageable with an edge portion of the attachment ring to which said inner circular ring is connected, pivotal actuation of said lever causing a disengagement of said rings.

* * * * *

UNITED STATES PATENT OFFICE
CERTIFICATE OF CORRECTION

Patent No. 4,276,636　　　　　　　　Dated 7/27/81

Inventor(s) Mr. Stanley A. Morgan

It is certified that error appears in the above-identified patent and that said Letters Patent are hereby corrected as shown below:

Column 1, line 39, "enlarge" should read -- "enlarged" -- ; column 2, line 41, "outer" should read -- other -- .

Signed and Sealed this

Twenty-ninth Day of September 1981

[SEAL]

Attest:

GERALD J. MOSSINGHOFF

Attesting Officer　　Commissioner of Patents and Trademarks